Patented Mar. 27, 1934

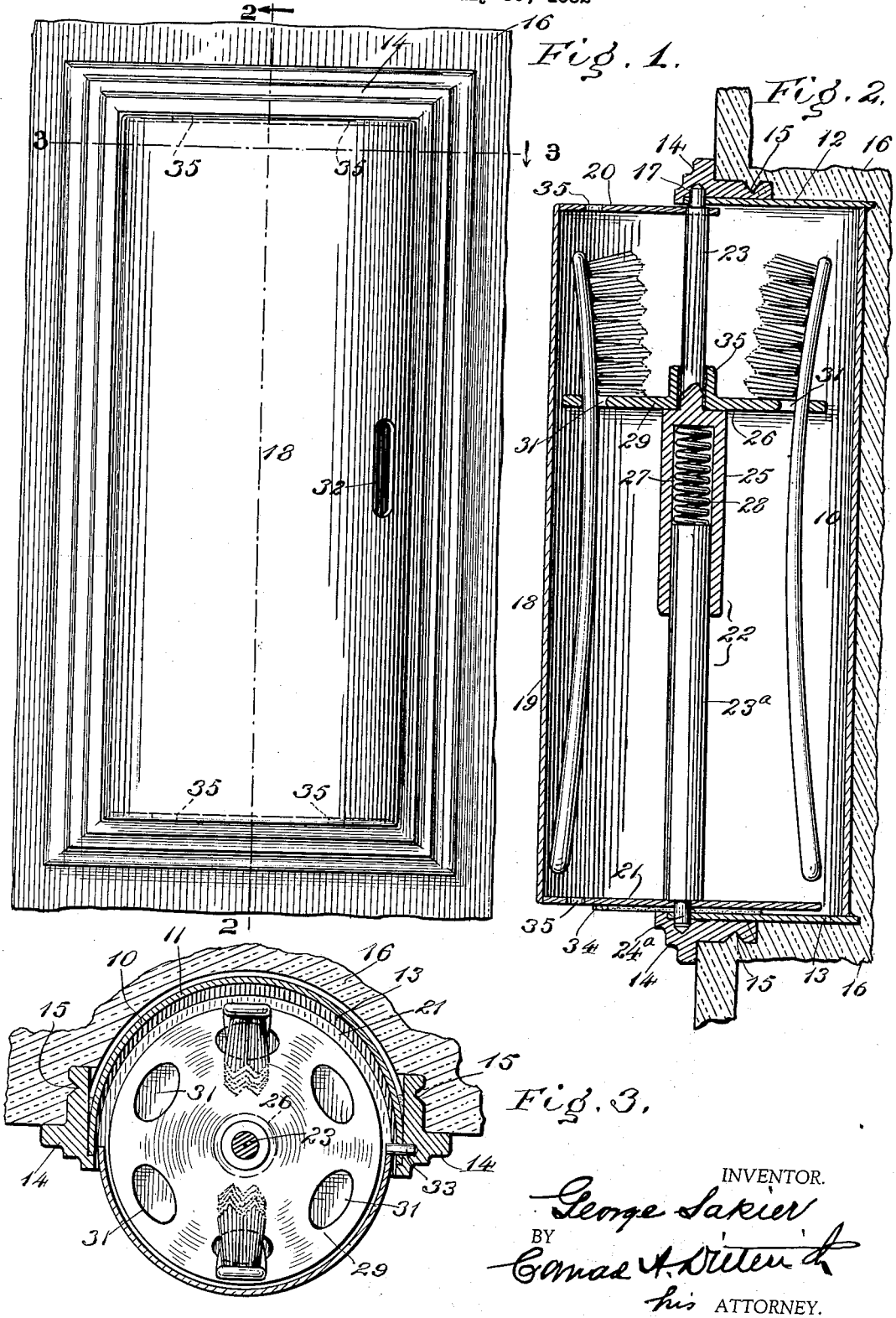

1,952,686

UNITED STATES PATENT OFFICE 1,952,686

TOOTHBRUSH RECEPTACLE

George Sakier, New York, N. Y.

Application July 30, 1932, Serial No. 626,370

6 Claims. (Cl. 206—15.1)

My invention relates to improvements in bath room fixtures, and the same has for its object to provide a simple, convenient and readily accessible container for tooth brushes, and other articles of analogous general form.

Further, said invention has for its object to provide a simple container or receptacle which may be built into the wall of a bath room, and serve as an easily accessible sanitary receptacle for concealing and storing tooth brushes and other articles.

Further, said invention has for its object to provide a container having its main portion or casing built into the wall of a bath or other room, and having a closure which may be rotated to conceal or expose the brushes or other articles disposed therein.

Further, said invention has for its object to provide a "built-in" container or receptacle having a closure or cover in which the means for supporting said closure or cover also serves as the means for rotatably supporting the brushes in readily accessible position within the receptacle.

Other objects will in part be obvious and in part be pointed out hereinafter.

To the attainment of the aforesaid objects and ends, my invention consists in the novel features of construction, and in the combination, connection and arrangement of parts hereinafter more fully described and then pointed out in the claims.

In the accompanying drawing—

Figure 1 is a front elevation showing one form of receptacle constructed according to, and embodying my said invention;

Fig. 2 is a central vertical section of the same, and

Fig. 3 is a transverse section on the line 3—3 of Fig. 1.

In said drawing the container or receptacle is shown as comprising a casing 10 of rectangular outline, disposed within a suitable recess in the wall of a room. The casing 10 is preferably made with a semi-cylindrical vertical wall 11, and semi-circular top 12 and bottom 13, and is open at its front and secured along the edges thereof to an ornamental frame 14 having recesses 15 in its outer edges to receive the plaster 16 of the wall in order to anchor said casing securely in position therein.

The top 12 and bottom 13, and the horizontal members of the frame 14 are jointly provided in their inner sides with sockets 17.

18 denotes a closure or cover having a semi-cylindrical vertical side wall 19, a semi-circular top 20 and a similar bottom 21. The closure 18 is revolubly secured within the open front of the casing 10 by a shaft 22 composed of two inter-engaging parts 23, 23ª, having reduced outer ends 24, 24ª, respectively, which extend through apertures in the top 12 and bottom 13 of the casing, and into the sockets 17 of the top and bottom members of the frame 14. The upper shaft part 23 is provided at its inner end with an enlarged cylindrical portion 25 whose upper end forms a shoulder 26, and with a socket 27 adapted to receive the inner end of the lower shaft part 23ª. Within the socket 27 is disposed a spiral spring 28 which serves to maintain the shaft parts 23, 23ª normally extended, and their outer ends in engagement with the sockets 17 of the frame 14.

Upon the upper shaft part 23, and resting loosely upon the shoulder 26, is disposed a circular plate 29 having a central hub 30, and a plurality of brush-receiving apertures 31.

The closure 18 is provided adjacent one of its vertical edges with a finger depression 32 to facilitate the opening and closing of said closure, and at one of its vertical edges the casing 10 is provided with an inwardly-extending pin 33 which is adapted to engage with the opposite vertical edges of said closure to limit the extent of the opening and closing movement thereof.

A washer 34 of suitable material may be introduced between the bottom 21 of the closure 18, and the bottom 13 of the casing 10 to insure the proper operation of the parts.

To properly ventilate the receptacle, and insure the drying of the brushes therein, the closure 18 is provided in its top and bottom with suitable apertures 35 to permit of the passage of air therethrough.

The operation of the device will be obvious from the foregoing description. It is to be noted, however, in assembling the device the closure or cover 18, with its open side foremost, is inserted into the casing 10, and the openings in the top and bottom thereof brought into register with the corresponding sockets 17 in the upper and lower members of the frame 14, whereupon the upper reduced end of the upper shaft part 23 passed through the opening in the top of the closure 18, and inserted in the adjacent socket 17 of the frame 14, and the inner end of the shaft part 23ª forced upwardly into the socket 27 of the upper shaft part 23 sufficiently to permit the lower reduced end of said lower shaft part 23ª being passed through the opening in the bottom 21 of the closure 18, and entered into the adjacent socket 17 of the lower member of the frame 14.

The shaft parts will be held duly in extended position within the casing 10 by the expansive action of the spring 28.

Having thus described my said invention what I claim and desire to secure by Letters Patent is—

1. A device of the character described comprising a casing adapted for securement to a wall, a revoluble closure for said casing, an extensible shaft extending through the ends of said closure and supported in said casing and serving to secure said closure to said casing, and brush-supporting means mounted on said shaft, substantially as specified.

2. A device of the character described comprising a casing adapted for securement to a wall, a revoluble closure for said casing including a wall member and end members, an extensible shaft extending through said closure ends and supported in said casing, a shoulder on said shaft, and brush-supporting means loosely supported upon said shoulder and rotatable on said shaft, substantially as specified.

3. A device of the character described comprising a casing open at one side and adapted for securement to a wall, a closure for said casing in said open side, a shaft comprising two inter-engaging parts, each having one end extending through said closure and said ends supported in said casing and serving to revolubly secure said closure to said casing and brush-supporting means mounted upon said shaft, substantially as specified.

4. A device of the character described comprising a casing open at one side and adapted for securement to a wall, a revoluble closure for said casing, a shaft comprising two parts, a socket on one of said parts adapted to receive one end of the other of said parts, a spring in said socket for maintaining said shaft parts normally extended with their outer ends extending through the ends of said closure and into said casing and serving as a pivot about which said closure rotates, and brush-supporting means mounted upon said shaft, substantially as specified.

5. A device of the character described comprising a casing open at one side, means for securing said casing to a wall, a revoluble, semi-cylindrical closure for said casing, a shaft comprising two parts, a socket at the inner end of one of said parts adapted to receive the inner end of the other of said parts, a spring in said socket serving to maintain said shaft parts normally extended and their outer ends reduced and extending through the ends of said closure and into the ends of said casing for rotatably supporting said closure, and a plate revolubly mounted upon said shaft, said plate having brush-receiving apertures therein, substantially as specified.

6. A device of the character described comprising a frame, a casing open at one side, and secured to said frame, means for securing said frame to a wall, a revoluble semi-cylindrical closure for said casing, a stop for limiting the movement of said closure, a shaft comprising two parts, a shouldered socket at the inner end of one of said parts adapted to receive the inner end of the other of said parts, a spring in said socket serving to maintain said shaft parts normally extended, and their reduced outer ends extending through the ends of said closure and into the frame of said casing for rotatably supporting said closure, and a plate loosely mounted upon said shaft, said plate having brush-receiving apertures therein, substantially as specified.

GEORGE SAKIER.